(12) United States Patent
Bealby

(10) Patent No.: US 12,553,928 B2
(45) Date of Patent: Feb. 17, 2026

(54) POWER LINE UTILIZATION MONITORING SYSTEMS, DEVICES, AND METHODS WITH MICROPROCESSOR-BASED CURRENT MEASUREMENT AND REMOTE AUTHENTICATION

(71) Applicant: Electro Rent Corporation, West Hills, CA (US)

(72) Inventor: Tim Bealby, Harrow (GB)

(73) Assignee: Electro Rent Corporation, West Hills, CA (US)

( * ) Notice: Subject to any disclaimer, the term of this patent is extended or adjusted under 35 U.S.C. 154(b) by 168 days.

(21) Appl. No.: 18/383,152

(22) Filed: Oct. 24, 2023

(65) Prior Publication Data

US 2024/0133931 A1 Apr. 25, 2024
US 2024/0230732 A9 Jul. 11, 2024

Related U.S. Application Data

(60) Provisional application No. 63/419,170, filed on Oct. 25, 2022.

(51) Int. Cl.
*G01R 21/08* (2006.01)
*G01R 21/133* (2006.01)

(52) U.S. Cl.
CPC ............ *G01R 21/08* (2013.01); *G01R 21/133* (2013.01)

(58) Field of Classification Search
CPC ............ G06F 13/4291; G06F 13/4217; G06F 1/3209; G06F 1/26; G06F 1/1684; H04W 88/02; H04W 4/80; H04B 5/45; H04B 5/72; G01R 21/133; G01R 22/063; G01R 21/06; G01R 15/202; G01R 19/2513; G01R 35/04; G01R 22/06; G01R 15/142; G01R 33/07; G01R 33/09; G01R 22/10; G01R 11/25; G01R 19/02; G01R 22/068; G01R 21/1336; G01R 21/1338
See application file for complete search history.

(56) References Cited

U.S. PATENT DOCUMENTS 4,158,810 A * 6/1979 Leskovar ............... G01R 15/26
374/E1.004
8,515,348 B2 * 8/2013 Kagan ................... H04W 76/14
702/62

(Continued)

FOREIGN PATENT DOCUMENTS

CN 113533875 A 10/2021

*Primary Examiner* — Vinh P Nguyen
(74) *Attorney, Agent, or Firm* — Command IP LLP; Pejman Yedidsion

(57) ABSTRACT

Systems, devices, and methods for an monitoring power consumption of a known electronic device including: monitoring, by a monitoring device, a received input electrical power from the known electronic devices; determining a maximum measured power value of the monitored input electrical power; converting the determined maximum power value to a current value; determining if the converted current value is greater than the determined maximum measured power value; connecting to a remote computing device and obtaining access to communicate with the remote computing device via an authentication process; and transmitting data to the connected remote computing device if the determined converted current value is greater than zero.

15 Claims, 10 Drawing Sheets

(56) References Cited

U.S. PATENT DOCUMENTS

| | | | | |
|---|---|---|---|---|
| 9,013,060 | B2 * | 4/2015 | Katru | H02J 3/14 |
| | | | | 307/131 |
| 10,241,140 | B2 * | 3/2019 | Moinuddin | G01D 4/00 |
| 10,545,555 | B2 * | 1/2020 | Han | G06F 1/3296 |
| 2005/0240417 | A1 | 10/2005 | Savage | |
| 2011/0202194 | A1 | 8/2011 | Kobraei et al. | |
| 2013/0304268 | A1 | 11/2013 | Pernia et al. | |
| 2015/0346249 | A1 | 12/2015 | Sugar | |

* cited by examiner

POWER LINE UTILIZATION MONITORING SYSTEMS, DEVICES, AND METHODS WITH MICROPROCESSOR-BASED CURRENT MEASUREMENT AND REMOTE AUTHENTICATION

CROSS-REFERENCE TO RELATED APPLICATION

This application claims the priority benefit of U.S. Provisional Patent Application Ser. No. 63/419,170 filed Oct. 25, 2022, incorporated herein by reference in its entirety.

TECHNICAL FIELD

The invention relates to power line monitoring, and more particularly to determining utilization of a device via a monitored power usage.

BACKGROUND

Electronic and electromechanical high value equipment, such as equipment used in manufacturing, HVAC, servers, etc., is used in a variety of industries to perform highly sensitive tasks. From measuring mass, performing millions of computations a second, to monitoring photons, high value equipment can be used to perform tasks that go beyond the needs of an average computer user. Inherently, such high-value lab equipment must be maintained, monitored, and calibrated regularly. Additionally, as new techniques of measurement, for example, are constantly being introduced, state-of-the-art lab equipment can be expensive not only to use but also to maintain. For high-value lab equipment rental facilities, understanding the health and usage of rented lab equipment is critical when determining and scheduling, for example, periodic maintenance, predicting failure, or making other business-related decisions concerning a piece of equipment.

SUMMARY

A method of monitoring power consumption of a known electronic device may include the steps of: monitoring, by a monitoring device, a received input electrical power from the known electronic device; determining a maximum measured power value of the monitored input electrical power, where the maximum measured power value may be determined based on scanning an Analog to Digital Converter (ADC) input pin; converting the determined maximum power value to a current value; determining whether the converted current value may be greater than zero; connecting to a remote computing device and obtaining access to communicate with the remote computing device via an authentication process; transmitting data to the connected remote computing device based on whether the determined converted current value may be greater than zero; and determining, by the remote computing device, a utilization rate of the known electronic device based on comparing the received transmitted data from the monitoring device against an associated standby current usage of a set of similar known electronic devices. In one embodiment, the input electrical power may be an ADC input pin. In one embodiment, monitoring a received input electrical power comprises taking a multitude of power measurements at the determined utilization rate. In one embodiment, the determined utilization rate may be based on measurements at predetermined intervals. In one embodiment, the authentication process may be performed wirelessly. In one embodiment, the authentication process may comprise authenticating the monitoring device by the remote computing device via an OAUTH2 authentication process.

The method embodiment may further include: the determined converted current value; and a set of unique device data associated with the monitored known electronic device. The method may further include: receiving data associated with the known electronic device from the remote computing device and use the received data to associate the received monitored device with a set of previously stored data by the remote computing device. Additionally, the method may include recording the received monitored data if information in the received monitored data may be greater than information in set of previously stored data. In one embodiment, the previously stored data comprises a list of electronic devices with corresponding mac addresses and maximum standby power values. In one embodiment, the determined maximum power value may be converted to a Root Mean Square (RMS) current value. In one embodiment, the monitoring device may include a Hall effect current sensor, a microprocessor, and a power supply and conditioner, where the power supply and conditioner may be used to power the microprocessor and the Hall effect current sensor.

A power line utilization monitoring system embodiment may include: a test equipment; a monitoring device comprising a Hall effect current sensor, a microprocessor, and a power supply and conditioner, where the microprocessor may be configured to receive a voltage value transmitted by the Hall effect current sensor and to convert the received voltage value to a current value; and a remote computing device, where the remote computing device comprises an authentication server, a web service, and a database service; where the microprocessor of the monitoring device may be configured to determine a change in the test equipment status based on comparing the converted current value with a threshold current value; where the microprocessor of the monitoring device may be further configured to communicate with the remote computing device based on a determined change in the test equipment status; and where the remote computing device may be configured to determine a utilization rate of the test equipment based on a set of data received from the microprocessor.

In one embodiment, the power supply and conditioner may be used to power the microprocessor and the Hall effect current sensor. In one embodiment, the Hall effect current sensor may be configured to monitor a monitored mains power line and transmits the monitored voltage value to the microprocessor via an ADC pin.

BRIEF DESCRIPTION OF THE DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which.

DETAILED DESCRIPTION

Figure 1:
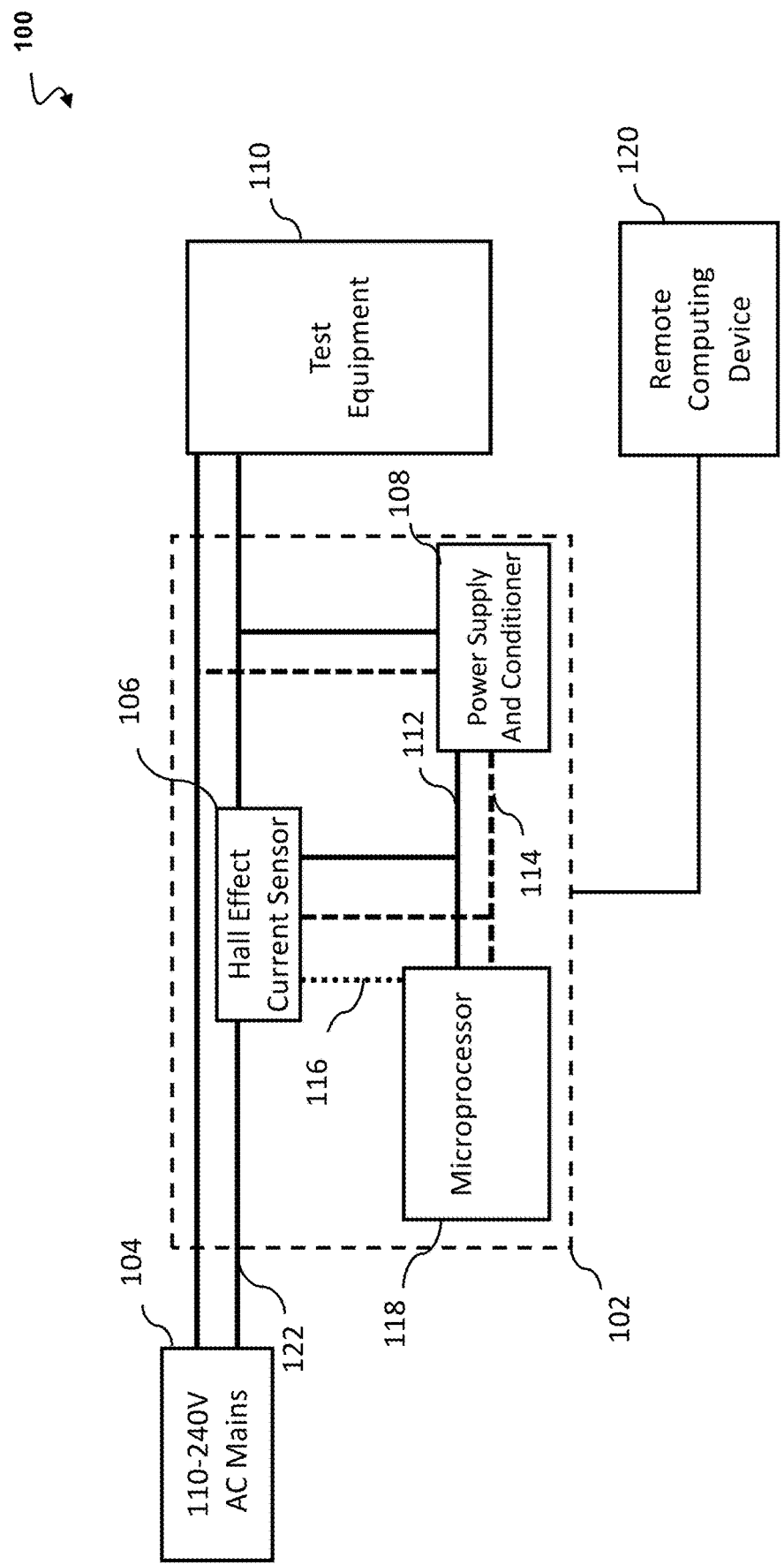
FIG. 1 depicts a high-level block diagram of power line utilization monitoring system, according to one embodiment.

In the disclosed embodiments, high-value lab equipment rental facilities may use and require active and dynamic information such as the age of a piece of equipment or the amount of time a piece of equipment was rented for in order to determine usage of such equipment, for example, availability, uptime, downtime, etc. Decisions on whether maintenance should be performed may be based on a maintenance schedule and usage or whether the performance of a piece of equipment was diminished. Accordingly, methods of monitoring and reacting to the health of rental lab test equipment, in a cost efficient and proactive nature, are disclosed herein. Other embodiments concern and disclose methods, systems, and devices for monitoring equipment when the equipment does not support direct electronic connectivity, does not have embedded processing/intelligence, and/or where direct monitoring is not allowed for security or IPR reasons. Additionally, embodiments provide methods of execution to measure performance of a piece of equipment in order to provide additional data points to the lab equipment rental facility and aid to prevent issues concerning the performance of a piece of equipment. Data points such as the amount of power drawn by a piece of equipment, how long a certain level was drawn, what types of tests were performed, etc. are invaluable to determining the health of electronics in general and high-value lab equipment specifically.

The following description is made for the purpose of illustrating the general principles of the embodiments disclosed herein and is not meant to limit the concepts disclosed herein. Further, particular features described herein can be used in combination with other described features in each of the various possible combinations and permutations. Unless otherwise specifically defined herein, all terms are to be given their broadest possible interpretation including meanings implied from the description as well as meanings understood by those skilled in the art and/or as defined in dictionaries, treatises, etc.

High-value lab test equipment use cutting edge technology to provide new and valuable information to a user. Often these pieces of equipment are sensitive, delicate to shock and vibration, costly, and perform large amounts of data point observations and computation. Environments that include high-value lab test equipment often do not leave many opportunities for an equipment owner, such as a lab test rental facility, to monitor the usage and performance of a specific piece of equipment. Nevertheless, information concerning the performance and usage of a piece of high-value lab test equipment is critical in determining the health, quality of performance, and even tracking of a rental device.

The present power line utilization monitoring system allows for the measurement, distribution, and analysis of a device's power usage, thereby determining a rate of utilization for a specific device/equipment. The disclosed measurement and analysis systems and methods provide greater insight into the use of a remote device, providing a granular determination and viewing capability of how specific usage trends may affect a specific piece of equipment, giving a user a greater and more informed viewpoint into making decisions concerning maintenance, costs associated with ownership, and business decisions pertaining to the rental of specific pieces of equipment. The disclosed measurement and analysis system also provides a user with the ability to predict critical events pertaining to a piece of equipment which go beyond basic methods of analysis, such as trend analysis, using machine learning, and high-level algorithms, etc.

The disclosed power line utilization monitoring systems, devices, and methods may include the use of an Analog to Digital Converter (ADC) where the ADC may provide an isolated measurement, such as an electronic device, that converts an analog input voltage or current to a digital number representing the magnitude of the voltage or current. The ADC may be configured to convert an analog voltage on a pin to a digital number, e.g., ADC input pin. By converting from the analog measurements to the digital measurements, the electronic device may provide an interface between the analog world and a digital world. Additionally, a Root Mean Square (RMS), for alternating electric current, is equal to the value of the constant direct current that would produce the same power dissipation in a resistive load. That is, current/voltage of the alternating current/voltage represents the direct current/voltage that dissipates the same amount of power as the average power dissipated by the alternating current/voltage. Accordingly, the RMS value of alternating current (AC) is equal to that amount of direct current (DC) which produces the same heating effect flowing through the same resistance for the same time. This functions to convert the value of the voltage on an analog input pin and returns a digital value relative to the reference value. Therefore, the equation given for the ADC noise requires the full scale RMS input voltage, and the full scale range corresponds to the peak-to-peak input.

The following terms are used herein with their associated indicators and may be used interchangeably:
power line utilization monitoring system (100, 500),
monitoring device (102, 204, 514), or power line utilization monitor (102, 204, 514),
Hall effect current sensor (106, 504),
a microprocessor (118, 506),
test equipment (110, 206, 510), or one of the following:
  monitored device (110, 206, 510),
  known electronic device (110, 206, 510),
remote computing device (120, 208, 512),
authentication server (210), web service (222) and a database service (226).

FIG. 1 depicts a high-level block diagram of the power line utilization monitoring system 100, according to the disclosed embodiments. The power line utilization monitoring system 100 as depicted, provides a system for monitoring the usage of high-level lab test equipment, and may include: a power supply 104; a power line utilization monitor 102, where the power line utilization monitor 102 may include: a Hall effect current sensor 106, a microprocessor 118 (e.g., ESP32, or a Raspberry Pi Pico W), and a power supply and conditioner 108 (e.g., a mini transformer); a test equipment 110 (also referred to as a monitored device); and a remote computing device 120.

The power line utilization monitor component 102 may be configured to measure the current of a monitored mains power line 122, also referred to as line voltage and/or line power. In one embodiment, the monitored mains power line 122 may be fed through a Hall effect current sensor 106. A power take-off from the monitored mains power line 122 may be used to feed the power supply and conditioner 108, where the power supply and conditioner 108 may be used to power the microprocessor 118 and the Hall effect current sensor 106. The power line utilization monitor component 102 may further be configured to convert the measured voltage to a current, and determine a maximum value of the converted current value. For example, during a cycling of power of a test equipment 110, the power supply 104 may deliver power to the test equipment 110. The power line utilization monitor component 102, using the Hall effect current sensor 106 monitoring a monitored mains power line 122, may transmit the monitored voltage value to the microprocessor 118 via an ADC pin 116. The Hall effect current sensor 106 may further be configured to transmit power to the microprocessor 118 and a power supply and conditioner 108, where the transmitted power may be a 5-volt power. That is, a ground line 112 and a 5V DC power line 114 may be used to feed power to the microprocessor 118 and Hall effect current sensor 106. The Hall effect current sensor 106 may further be configured to provide the ground line 112 to the microprocessor 118 and the power supply and conditioner 108.

The microprocessor 118 may be configured to receive the voltage value transmitted by the Hall effect current sensor 106 and may be configured to convert the received voltage value to a current value. The microprocessor 118 may further be configured to determine the status of the test equipment 110 based on the converted current value. In some embodiments, the microprocessor 118 may determine the status of the test equipment 110 by referring to a threshold current value stored in an addressable memory. In other embodiments, the status of the test equipment 110 may be determined if a detected current value is greater than zero. In other embodiments, the microprocessor 118 may further be configured with a timer, where the timer is capable of providing a time value associated with a measured current value. In this embodiment the microprocessor 118 may compare a converted current with a threshold value stored in an addressable memory and a threshold time value, where if both threshold values are lower than the measured current and time values, the microprocessor may determine a change in the test equipment 110 status.

In some embodiments, the microprocessor 118 may be configured to take power line measurements at predetermined intervals. In another embodiment, the microprocessor 118 may be configured to transmit the measurements at predetermined intervals that are different than the intervals when the measurements are taken. That is, the measurements may be taken at an interval larger than the transmission of the measurements thereby providing a layer of privacy should, for example, the test equipment 110 user not want the remote computing device 120 to be aware of real-time usages of the test equipment 110.

The microprocessor 118 may also be configured to communicate with a remote computing device 120. In one embodiment, the microprocessor may be configured to communicate with the remote computing device 120 via a wireless communication such as, for example, Bluetooth, Zigbee, Wi-Fi, and other common short-range and long-range methods of communication. In one embodiment, the microprocessor 118 may include an addressable memory that may store information necessary for an authentication. The microprocessor 118 may be configured to connect with a remote computing device 120 when a predetermined condition is fulfilled. In some embodiments, a predetermined condition may be fulfilled if a detected current is greater than zero. In other embodiments, a predetermined condition may be fulfilled based on previously discussed voltage and timing thresholds. In some embodiments, the authentication process is performed wirelessly. In some of these embodiments, the wireless authentication process is performed via Wi-Fi.

The remote computing device 120 may be configured to receive a communication request from the microprocessor 118 of the power line utilization monitor 102. The remote computing device 120 may further be configured to authenticate the communication where an authentication may by executed using, for example, an OAUTH2 method. The remote computing device 120 may further include an addressable memory, where the addressable memory may include a list of associated test equipment data. In one embodiment, the list of associated test equipment data may include: test equipment manufacturer names, model numbers, serial numbers, threshold values, and test equipment historical usage data. The remote computing device 120 may be further configured to receive information from the microprocessor 118 of the power line utilization monitor 102, where the received information may include a measured current value, an associated test equipment manufacturer name, a model number, serial number, and a time stamp. The remote computing device 120 may be further configured to receive information from the microprocessor 118 of the power line utilization monitor 102 at a predetermined interval. As described herein, the information may be transmitted and received at different time intervals than when the information was collected and determined to be useful to the remote computing device 120.

In one embodiment, the remote computing device 120 may be a cloud computing device. The remote computing device 120 may be capable of performing machine learning, where a received set of information from a power line utilization monitor component 102, may be compared to previously collected and stored historical data associated with the device and calculations, for example, a predicted failure estimate may be determined concerning the specific test equipment. Accordingly, the system 100 may function together to collect data from multiple test equipment, at a particular site or across a number of sites. The system 100 may then use the data to train the machine learning algorithm with the historical data via detected patterns or deviations in the model to determine predictions for one or more specific test equipment each having similar identifying information.

The remote computing device 120 may determine a utilization rate of the test equipment 110 (also referred to as a known electronic device or monitored device) based on comparing the received data against an associated standby current usage of a set of other test equipment, for example, similar known electronic devices having the same manufacturer name and/or model number. In other embodiments, other means of identifying the test equipment, in order to assess similarity, may be used as well. That is, the remote computing device 120 may access a database configured to store an associated list of standby current usages for a given test equipment, where the database has collected such data via data science to extract meaning from the collected data and machine learning to understand and build models and methods that utilize data to improve performance and inform predictions. Additionally, using machine learning algorithms, and based on statistical models, the remote computing device 120 may analyze and draw inferences from patterns in data associated with prior use of the same test equipment or prior uses of similar type of test equipment. In another embodiment the remote computing device 120 may be configured to further communicate with additional external devices creating a distributed system to accomplish, for example, distributed machine learning, where the distributed system includes components located on different networked computers, which communicate and coordinate their actions by passing messages to one another from any system.

In one embodiment, monitoring a received input electrical current may comprise taking a multitude of current measurements such as 10,000 over one second, calculating the RMS value, filtering out any spikes and then pausing for one minute.

In the disclosed embodiments of system 100, the power supply and conditioner 108 may be configured to power the microprocessor and Hall effect sensor, for example, with 5V DC. In one embodiment, the power supply and conditioner 108 may use or take very little power to function, thereby use of the power supply and conditioner 108 does not affect the reading of the current passing through to the monitored instrument.

Figure 2:
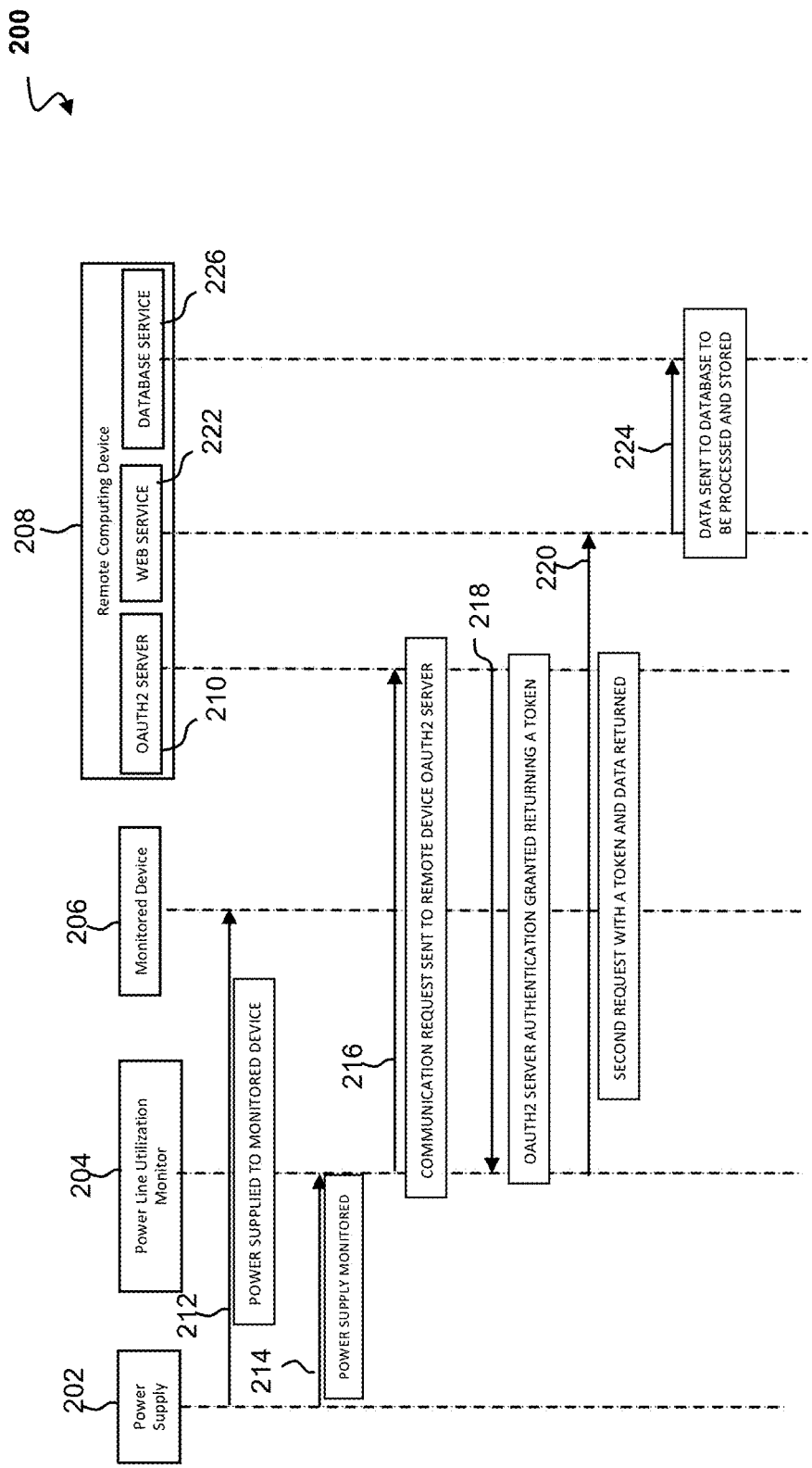
FIG. 2 depicts a signal flow of a power line utilization device, according to one embodiment.

FIG. 2 depicts a signal flow of a power line utilization device 200, according to one embodiment. In the depicted embodiment, a first power 212 may be supplied from a power supply 202 to a test equipment being monitored, e.g., monitored device 206. Upon the monitored device 206 powering on, the power line utilization monitor is powered 214 and a detected voltage above a predetermined threshold is measured. A communication request 216 may then be sent to an OAUTH2 server 210 of a remote computing device 208 where the communication request may include necessary authentication information. The OAUTH2 server 210 may in some embodiments be any authentication server having been configured to provide authentication services. The embodiments further disclose a remote computing device 208 that uses the OAUTH2 server 210 to authenticate the communication request. The OAUTH2 server 210, after authenticating the information, may transmit a message back to the Power Line Utilization Monitor 204 where the message may include a valid token 218. Upon receipt of the message sent from the OAUTH2 server containing the valid token, the Power Line Utilization Monitor 204 may subsequently send a second request to the remote computing device 208 containing the valid token and the monitored data 220 collected from the monitored device 206 which is received by a Web Services component 222. The Web Services component 222, upon receipt of the Power Line Utilization Monitor data 220, may transmit and/or transfer 224 the data to a database services component 226 where the data is processed and stored.

Figure 3:
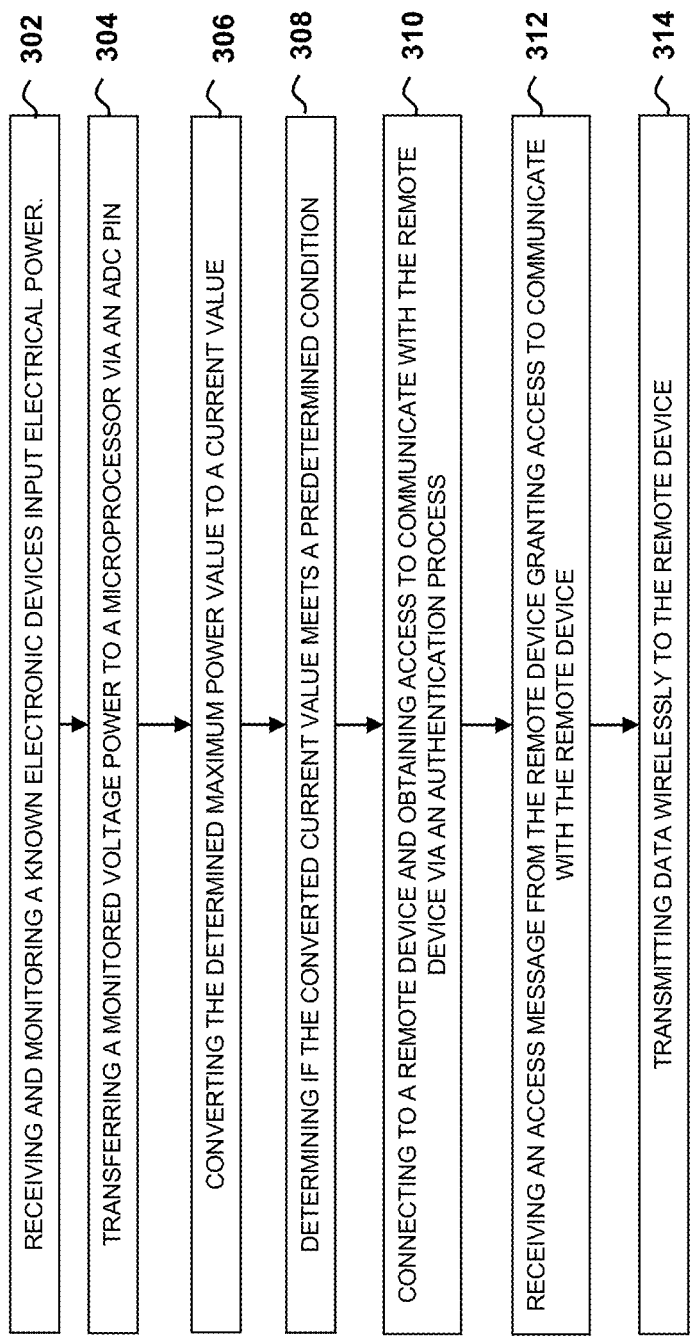
FIG. 3 depicts a method for monitoring and transmitting data of a power line utilization monitor system, according to one embodiment.

FIG. 3 depicts a flowchart of a method for monitoring and transmitting data of a power line utilization monitor system 300, according to one embodiment. In an initial step, the power line utilization monitor receives power from a power supply and monitors a known electronic device, e.g., a monitored device's input electrical power (step 302). Upon receipt of an input electrical power, voltage power value is transferred to a microprocessor via an ADC pin (step 304). "Voltage power value" may be referred to as simply "power value" or "voltage power". Upon receipt of the voltage power, the microprocessor converts the voltage to a current value (step 306). The microprocessor may then be configured to determine if the converted current meets a predetermined condition (step 308) and connects to a remote device requesting an authentication to communicate (step 310). Upon receipt from a remote device of an access message granting access to communicate with the remote device (step 312), the power line utilization monitor then transmits data, for example, wirelessly, to the remote device (step 314). In other embodiments, the data may be transmitted via a wired connection or any other means available to transfer data. In some other embodiments, the measured current value of the monitored input electrical power cable is determined based on scanning an Analog to Digital Converter (ADC) input pin.

Figure 4:
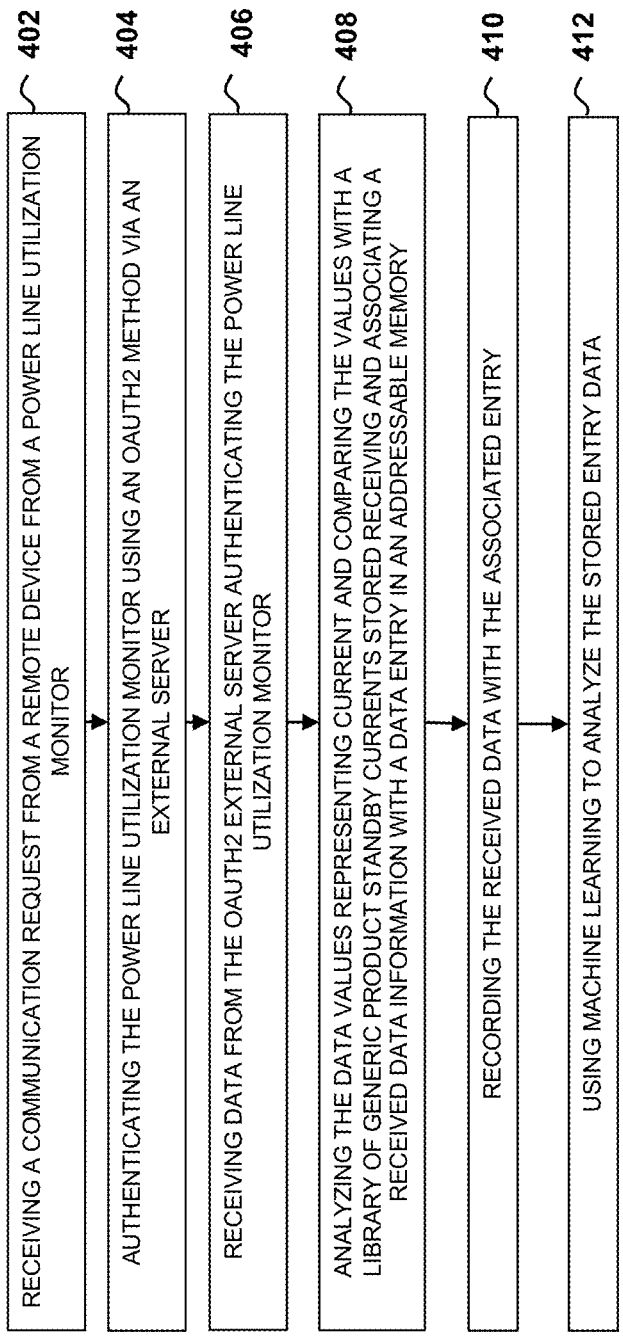
FIG. 4 depicts a method for receiving and processing a power line utilization monitor data, according to one embodiment.

FIG. 4 depicts a flowchart of a method for receiving and processing power line utilization monitor data by a remote computing device 400, according to one embodiment. In an initial step, a remote computing device receives a communication request from a power line utilization monitor (step 402). The remote computing device, using information received in the communication request, may then authenticate the power line utilization monitor via an OAUTH2 method which involves usage of an OAUTH2 server and transmitting a valid token to the power line utilization monitor (step 404). Based on receiving data and a valid token from the power line utilization monitor, the remote computing device may then authenticate the power line utilization monitor (step 406). Subsequent to the authentication step, the remote computing device may continue by analyzing the data values representing the detected current and comparing the values with a library of generic product standby currents stored in an addressable memory (step 408). At the next step, the method may perform recording the received data with the associated entry (step 410). In some embodiments, the remote computing device may use machine learning to analyze the stored entry data information (step 412). In one example, machine learning may be used to detect momentary spikes relating to utilization via settings being changed manually or remotely. In one embodiment, stored entry data may include a list of electronic devices with corresponding mac addresses and maximum standby power values. Additionally, the stored entry data may also include at least one of: a measured ambient temperature; a measured internal temperature; an associated entry data historical data; a historical failure data; a predictive failure data; and a maximum power usage duration.

Figure 5:
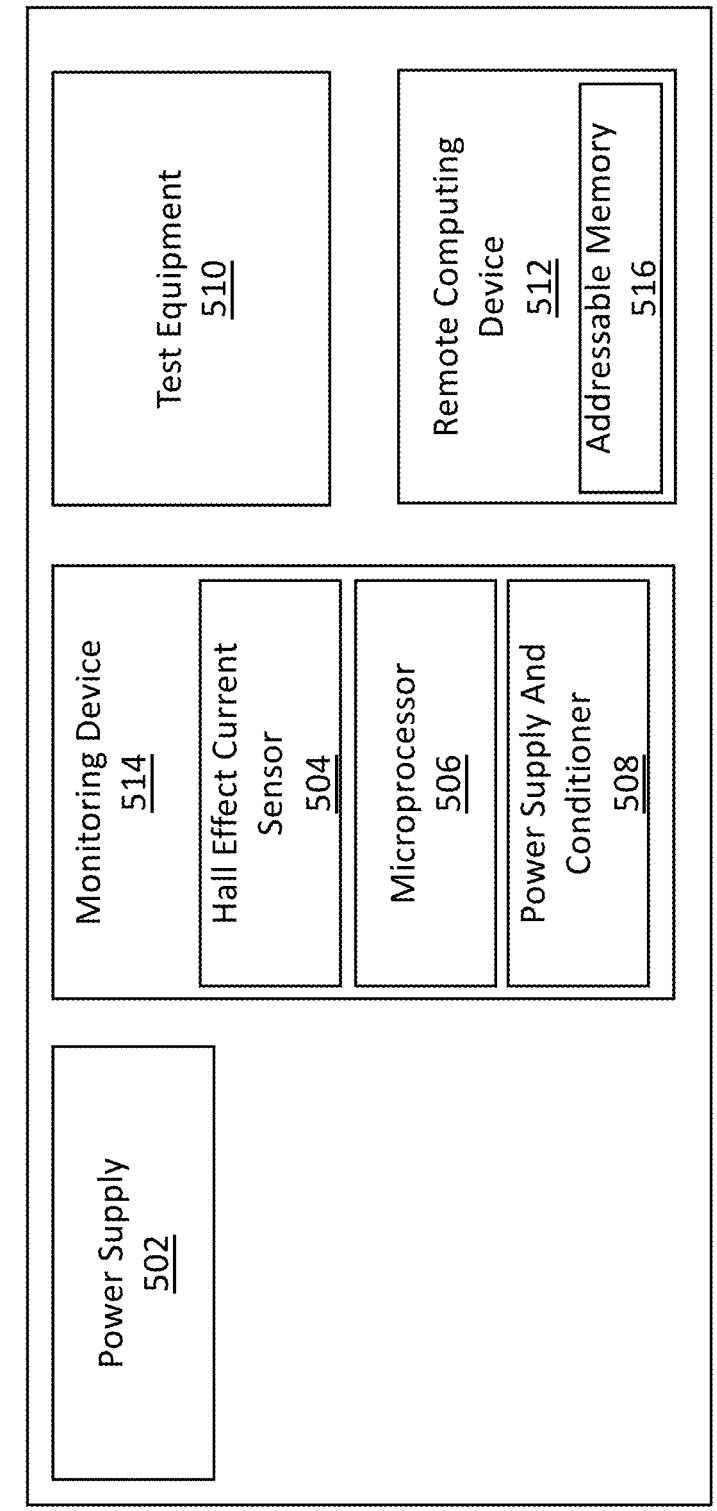
FIG. 5 depicts a high-level block diagram of a power line utilization monitor system, according to one embodiment.

FIG. 5 depicts a high-level block diagram of a power line utilization monitor system 500, according to one embodiment. A power line utilization monitor, according to one embodiment, includes: a power supply 502; a monitoring device 514, where the monitoring device 514 includes: a Hall effect current sensor 504, a microprocessor 506, and a power supply and conditioner 508; a test equipment 510; and a remote computing device 512, where the remote computing device 512 includes an addressable memory 516. The monitoring device 514 may be equivalent to a power line utilization monitor 102 of FIG. 1.

In some embodiments, information of the received monitored data may include a measured current data of a monitored device (102, 206, 514); and a mac address of a monitored device (102, 206, 514). The information of the received monitored data may further include at least one of: a time stamp of the measured current data, a time stamp of monitored device power on time; and a time stamp of a monitored device power off time.

Figure 6:
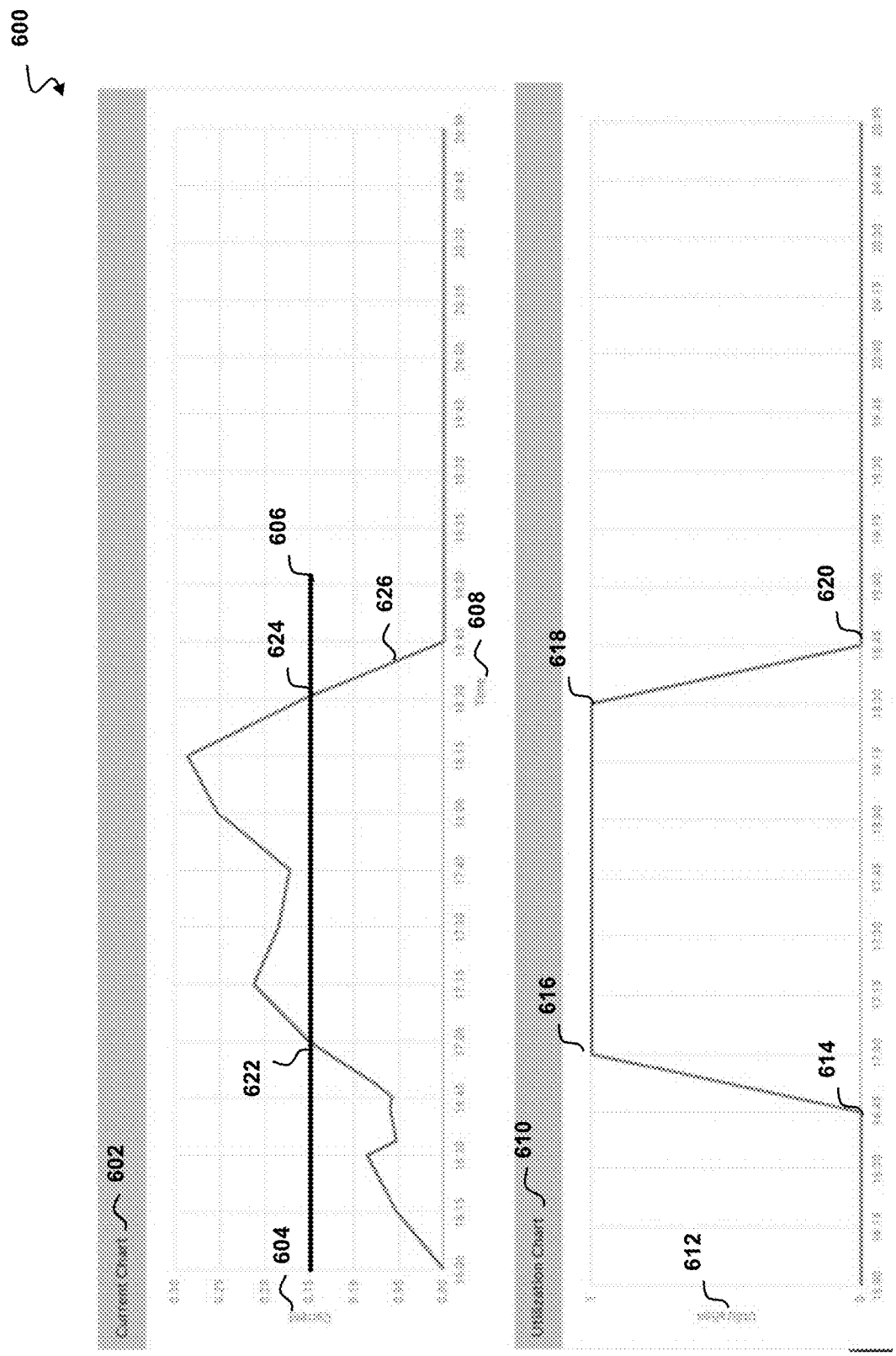
FIG. 6 depicts current and utilization graphs of a monitored device, according to one embodiment.

FIG. 6 depicts current and utilization graphs of a monitored device 600, according to one embodiment. A current chart 602 shows a detected and measured current 626 of a monitored device. Current chart 602 and utilization chart 610 depict data with a Y axis of current and voltage respectively. The X axis for both charts may use measurements of time. In current chart 602, the values of current are indicated by label 604. In utilization chart 610, the values of utilization are indicated by label 612. FIG. 6 further depicts how utilization is inferred by referencing a threshold current represented by the threshold value line 606 shown here measured in Amps (A). The shown threshold current value is for example purposes and may be set to any arbitrary value or based on historically collected data. In one embodiment, the threshold value may be determined by a determined associated device data entry. As depicted, a current at time 16:00 (4:00 PM) on the current chart 602 is detected and measured, represented by line 626. At time 17:00 (5:00 PM), the measured current crosses a threshold value line 606 at point 622. The power line utilization monitor uses the threshold value line 606 to infer that a monitored device is being used and a utilization value changes from zero value at point 614 to a 1 value at point 616. The utilization value is maintained as long as a measured current 626 remains above a threshold value line 606, which is represented by the points 622 and 624 where the measured current 626 drops below the threshold value line 606. Referring to the utilization chart 610, this period is simultaneously represented as a 1 value from points 616 to 618, where the utilization value drops back down to zero at point 620 and a monitored device is inferred to not be in use. As depicted, at time 18:45 (6:45 PM), the measuring is stopped.

In one embodiment, additional sensors may be employed where the sensors may include one or more temperature sensors and humidity sensors, configured to collect additional data points on the monitored devices/instruments. In one example, the temperature sensor may be away from the main PCB so that air temperature may be measured and not temperature of the PCB. Additionally, a set of cavities (holes) may be included in the case of the monitored devices to allow flow of external air for the aforementioned one or more sensors. Additionally, a second higher current sensor may be installed and included where the original (first) sensor, e.g., Hall effect current sensor, may have just had one 0-5 A sensor. In this embodiment, a second 0-30 A sensor with a manual switch in the case may be included to allow hardwire of the second higher current sensor for measuring current of monitored instruments or other higher current equipment such as HVAC or a whole test bench. A 0-30 A sensor alone may not provide accurate lower current readings in 0-5 A range as the 0-5 A sensors are configured to provide and therefore, in some embodiments, the two sensors—first lower current sensor and second higher current sensor—may be needed.

In one embodiment, addition of a relay in the main power output to the measured instrument may be included. Accordingly, this may allow the system to remotely flip the power off and back on to the instrument which may flip the instrument back to standby mode. Typically, users leave instruments running in power on mode which is 10× as power hungry as when in standby mode. This embodiment may provide the ability for customers to switch off low priority instruments to save, for example, 90% power for other more important projects, thereby save energy and money. In another embodiment, actual power use may be monitored via calculating and reporting data to a client device executing an application.

As has been described herein, in one system embodiment, a power line utilization monitoring system may be configured to monitor the usage of an electronic device and include: a power supply (e.g., 110-240V AC); a monitored device (e.g., lab test equipment or instrument); a power monitoring device, where the power monitoring device may include: a microprocessor (e.g., ESP32 or Raspberry Pi Pico W), where the microprocessor may be configured to wirelessly communicate with a remote computing device, a Hall effect current sensor, and a power supply and conditioner; and a remote computing device, where the remote computing device may be capable of receiving information from the microprocessor via a wireless connection, for example, a Wi-Fi connection.

In one embodiment, the remote computing device may be configured to perform authenticating of the microprocessor using an authentication such as, for example an OAUTH2. In one embodiment, the remote computing device may include an addressable memory configured to receive information from the microprocessor and record the information. In another embodiment, the remote computing device may be capable of receiving a unique identifier from the power monitoring device. In some embodiments, the received identifier may be a unique code burnt into the WiFi chip by the chip manufacturer such as a MAC address or IMEI. In other embodiments, the remote computing device may be configured to also receive a date/time stamp and a current value.

In another embodiment, received information may include transmitting the equipment's manufacturer's name, a model number, a time stamp, and a current draw value. In other embodiments, the received information may further include location information, where location information may include, for example a GPS location, a mac address, and a connected Wi-Fi name. In another embodiment, the remote computing device's addressable memory may include a data store, storing a list of test equipment associated information such as, for example, equipment's manufacturer name, the equipment's model number, a serial number, associated equipment's standby value, and a current threshold value.

In another embodiment, the remote computing device's data store additionally stores, multiple current threshold values associated with specific tests. For example, a specific piece of test equipment may be capable of performing three tests, where each test requires a specific current draw. If a detected current draw reaches a current draw threshold value, the remote computing device would store a record associated with the piece of equipment concerning with the associated test. In another embodiment, the remote computing device is capable of receiving information from a microprocessor and performing machine learning on the information based on previously recorded and stored information associated with the piece of equipment.

In another embodiment, the remote computing device may be capable of comparing received information with several sources of information wirelessly available to it. For example, a remote computing device may receive usage data from a piece of equipment, compare it to locally stored information and further compare the information to an external data store, holding similarly collected information. In another embodiment, the remote computing device may store critical current threshold values, where the critical current threshold values may be associated with events which require heightened attention. For example, if a remote computing device receives information which indicates that a current associated with a specific piece of equipment has breached a critical current threshold, the remote computing device may be capable of storing a record indicating a critical current threshold breach. In another embodiment, the remote computing device may be capable of communicating information to a high-value lab equipment user via, for example a standardized email or text message.

In one method embodiment, a power line usage monitoring system configured to monitor the usage of an electronic device may include: monitoring a power line of a monitored device; detecting a voltage value which is greater than a predetermined value; connecting wirelessly to a remote computing device; receiving information related to an authentication process to communicate with the remote device and being authenticated to communicate with the remote computing device; transmitting monitored device associated information to a remote computing device; recording a monitored voltage value and converting the detected voltage to a current value at a specified interval; transmitting the current value to the remote computing device at the specified time interval; determining that a voltage value of the monitored device has dropped to zero; disconnecting a connection with the remote computing device after it has been determined that the monitored device is no longer in use.

In one method embodiment, a predetermined voltage value may be a value stored in an addressable memory, where the addressable memory voltage value is compared to the detected voltage value and if the detected voltage value exceeds the stored voltage value, the monitoring system continues to the next step. If the voltage value is determined to not exceed the stored voltage value, the monitoring device continues to monitor the power line but does not continue to the next step. In one method embodiment, a stored voltage value is also associated with a stored time, where if a detected voltage value exceeds the stored voltage value for a duration which exceeds the stored time, then the monitoring device continues to the next step. In one method embodiment, an authentication step may be an OAUTH2. In another method embodiment, during an authentication step, a separate remote computing device is contacted to provide authentication information.

In one embodiment, a system configured to measure a single element using a simultaneous conductive trace and piezoelectric sensor amplifier circuit disclosed herein may include: a measurement structure, the measurement structure comprising a piezoelectric material and a conductive substrate, where the piezo-electric material and the conductive substrate share a surface, and a conductive trace, where the conductive trace is situated on a surface of the piezoelectric material and is capable of providing lead points accessible at, at least two ends of the conductive trace, and a ground point leading from a surface of the conductive substrate; a sensor amplifier, the sensor amplifier comprising: a conductive trace sensor amplifier, where the conductive trace sensor amplifier may include a Wheatstone bridge, where the Wheatstone bridge is configured to receive signals leading from the at least two ends of the conductive trace and output the received signal from the at least two ends of the conductive trace, and a differential amplifier, where the differential amplifier is capable of receiving the output signal from the Wheatstone bridge and output the received signal, a piezoelectric sensor amplifier, where the piezo electric sensor amplifier includes a charge amplifier, where the charge amplifier is configured to receive a signal from the ground point leading from the surface of the conductive substrate, and a power supply, where the power supply is configured to receive a power from an external power supply, and provide power to the conductive trace sensor amplifier, and the piezoelectric sensor amplifier; output buffers, where the output buffers include a first high-z buffer configured to receive a signal from the piezoelectric sensor amplifier and a second high-z buffer configured to receive a signal from the conductive trace sensor amplifier, and a power supply, where the power supply is configured to supply a power to the power supply of the sensor amplifier; a trace sensor output leading from the high-z buffer receiving a signal from the conductive trace sensor amplifier; a piezoelectric sensor output leading from the high-z buffer receiving a signal from the piezoelectric sensor amplifier; and a ground leading from the output buffer's power supply.

FIGS. 7-10 and the following discussion provide a brief, general description of a suitable computing environment in which aspects of the described technology may be implemented. Although not required, aspects of the technology may be described herein in the general context of computer-executable instructions, such as routines executed by a general- or special-purpose data processing device (e.g., a server or client computer). Aspects of the technology described herein may be stored or distributed on tangible computer-readable media, including magnetically or optically readable computer discs, hard-wired or preprogrammed chips (e.g., EEPROM semiconductor chips), nanotechnology memory, biological memory, or other data storage media. Alternatively, computer-implemented instructions, data structures, screen displays, and other data related to the technology may be distributed over the Internet or over other networks (including wireless networks) on a propagated signal on a propagation medium (e.g., an electromagnetic wave, a sound wave, etc.) over a period of time. In some implementations, the data may be provided on any analog or digital network (e.g., packet-switched, circuit-switched, or other scheme).

The described technology may also be practiced in distributed computing environments where tasks or modules are performed by remote processing devices, which are linked through a communications network, such as a Local Area Network ("LAN"), Wide Area Network ("WAN"), or the Internet. In a distributed computing environment, program modules or subroutines may be located in both local and remote memory storage devices. Those skilled in the relevant art will recognize that portions of the described technology may reside on a server computer, while corresponding portions may reside on a client computer (e.g., PC, mobile computer, tablet, or smart phone). Data structures and transmission of data particular to aspects of the technology are also encompassed within the scope of the described technology.

Figure 7:
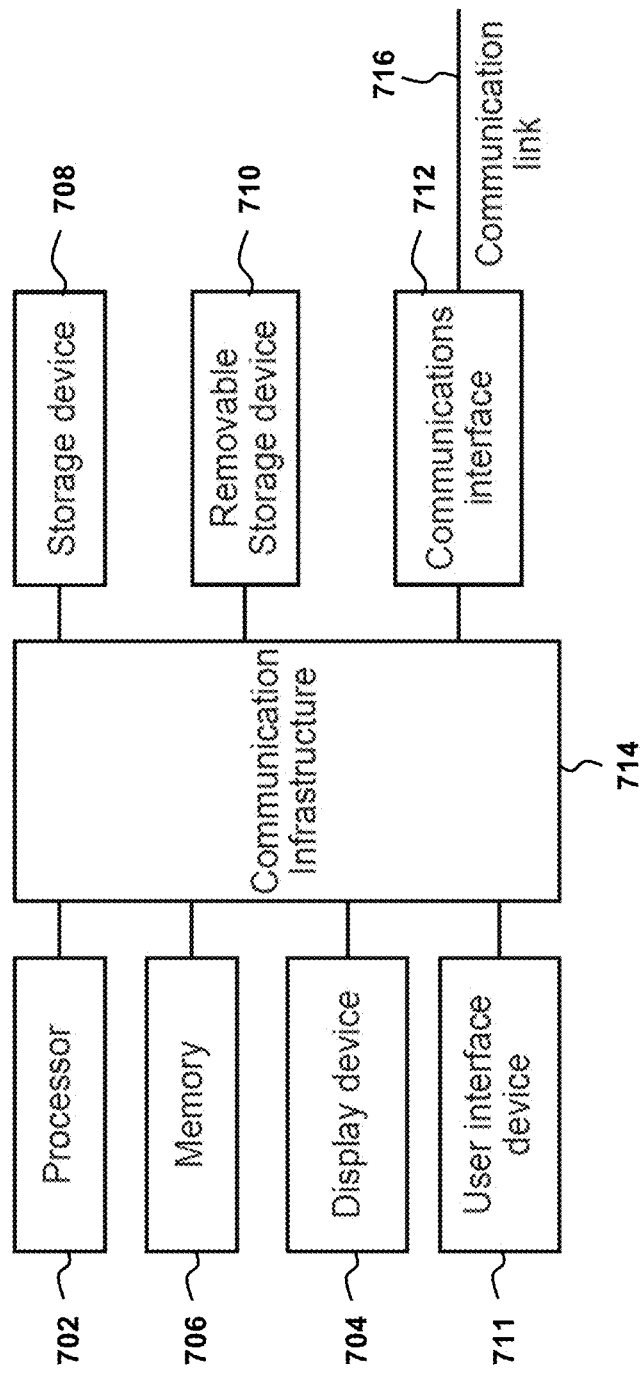
FIG. 7 is a high-level block diagram showing a computing system comprising a computer system useful for implementing an embodiment of the system and process.

FIG. 7 is a high-level block diagram 700 showing a computing system comprising a computer system useful for implementing an embodiment of the system and process, disclosed herein. Embodiments of the system may be implemented in different computing environments. The computer system includes one or more processors 702, and can further include an electronic display device 704 (e.g., for displaying graphics, text, and other data), a main memory 706 (e.g., random access memory (RAM)), storage device 708, a removable storage device 710 (e.g., removable storage drive, a removable memory module, a magnetic tape drive, an optical disk drive, a computer readable medium having stored therein computer software and/or data), user interface device 711 (e.g., keyboard, touch screen, keypad, pointing device), and a communication interface 712 (e.g., modem, a network interface (such as an Ethernet card), a communications port, or a PCMCIA slot and card). The communication interface 712 allows software and data to be transferred between the computer system and external devices. The system further includes a communications infrastructure 714 (e.g., a communications bus, cross-over bar, or network) to which the aforementioned devices/modules are connected as shown.

Information transferred via communications interface 712 may be in the form of signals such as electronic, electromagnetic, optical, or other signals capable of being received by communications interface 712, via a communication link 716 that carries signals and may be implemented using wire or cable, fiber optics, a phone line, a cellular/mobile phone link, a radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process.

Embodiments have been described with reference to flowchart illustrations and/or block diagrams of methods, apparatus (systems) and computer program products according to embodiments. Each block of such illustrations/diagrams, or combinations thereof, can be implemented by computer program instructions. The computer program instructions when provided to a processor produce a machine, such that the instructions, which execute via the processor, create means for implementing the functions/operations specified in the flowchart and/or block diagram. Each block in the flowchart/block diagrams may represent a hardware and/or software module or logic, implementing embodiments. In alternative implementations, the functions noted in the blocks may occur out of the order noted in the figures, concurrently, etc.

Computer programs (i.e., computer control logic) are stored in main memory and/or secondary memory. Computer programs may also be received via a communications interface 712. Such computer programs, when executed, enable the computer system to perform the features of the embodiments as discussed herein. In particular, the computer programs, when executed, enable the processor and/or multi-core processor to perform the features of the computer system. Such computer programs represent controllers of the computer system.

Figure 8:
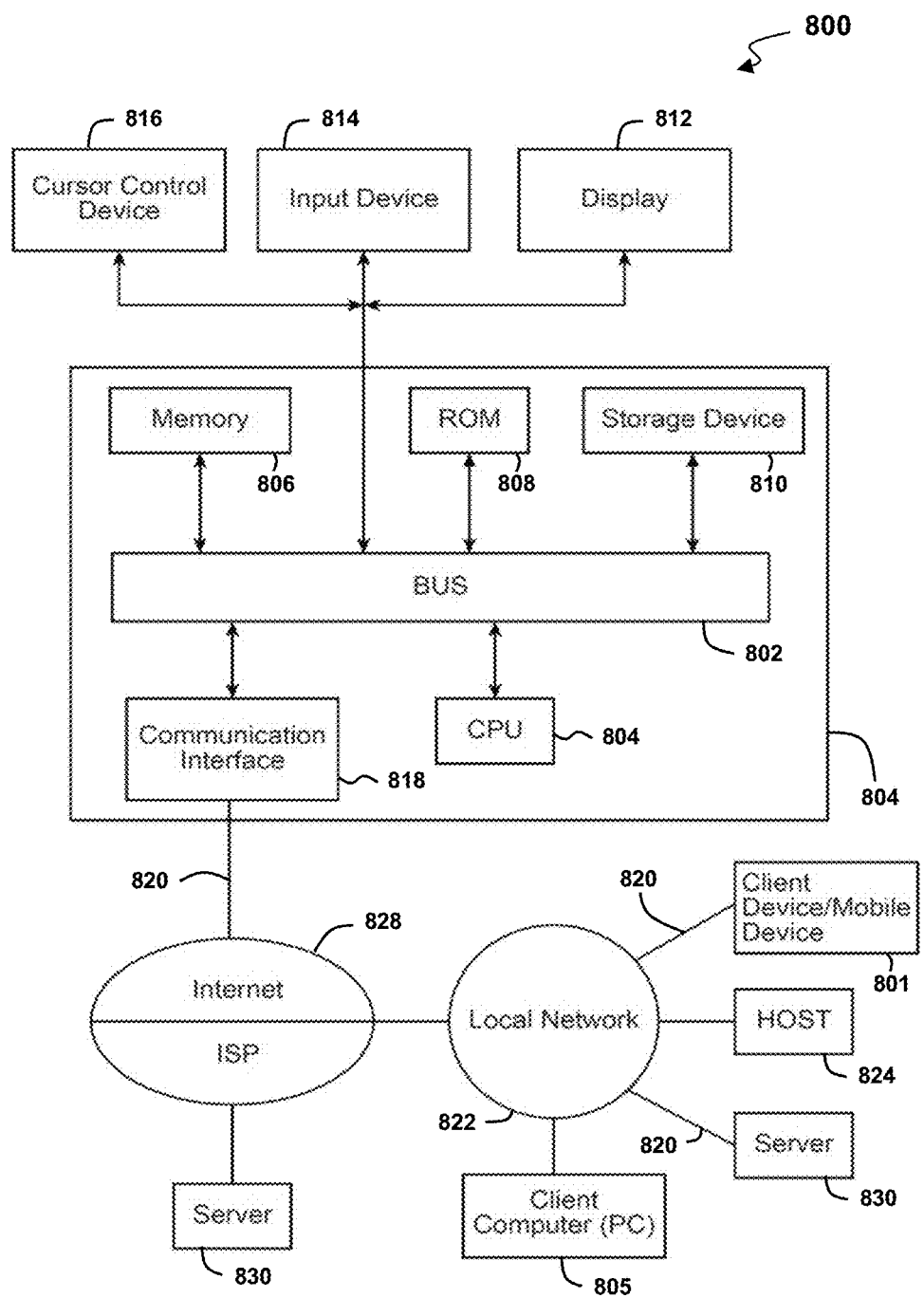
FIG. 8 shows a block diagram of an example system in which an embodiment may be implemented.

FIG. 8 shows a block diagram of an example system 800 in which an embodiment may be implemented. The system 800 includes one or more client devices 801 such as consumer electronics devices, connected to one or more server computing systems 830. A server 830 includes a bus 802 or other communication mechanism for communicating information, and a processor (CPU) 804 coupled with the bus 802 for processing information. The server 830 also includes a main memory 806, such as a random access memory (RAM) or other dynamic storage device, coupled to the bus 802 for storing information and instructions to be executed by the processor 804. The main memory 806 also may be used for storing temporary variables or other intermediate information during execution or instructions to be executed by the processor 804. The server 830 further includes a read only memory (ROM) 808 or other static storage device coupled to the bus 802 for storing static information and instructions for the processor 804. A storage device 810, such as a magnetic disk or optical disk, is provided and coupled to the bus 802 for storing information and instructions. The bus 802 may contain, for example, thirty-two address lines for addressing video memory or main memory 806. The bus 802 can also include, for example, a 32-bit data bus for transferring data between and among the components, such as the processor 804, the main memory 806, video memory and the storage device 810. Alternatively, multiplex data/address lines may be used instead of separate data and address lines.

The server 830 may be coupled via the bus 802 to a display 812 for displaying information to a computer user. An input device 814, including alphanumeric and other keys, is coupled to the bus 802 for communicating information and command selections to the processor 804. Another type or user input device comprises cursor control 816, such as a mouse, a trackball, or cursor direction keys for communicating direction information and command selections to the processor 804 and for controlling cursor movement on the display 812.

According to one embodiment, the functions are performed by the processor 804 executing one or more sequences of one or more instructions contained in the main memory 806. Such instructions may be read into the main memory 806 from another computer-readable medium, such as the storage device 810. Execution of the sequences of instructions contained in the main memory 806 causes the processor 804 to perform the process steps described herein. One or more processors in a multi-processing arrangement may also be employed to execute the sequences of instructions contained in the main memory 806. In alternative embodiments, hard-wired circuitry may be used in place of or in combination with software instructions to implement the embodiments. Thus, embodiments are not limited to any specific combination of hardware circuitry and software.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network that allow a computer to read such computer readable information. Computer programs (also called computer control logic) are stored in main memory and/or secondary memory. Computer programs may also be received via a communications interface. Such computer programs, when executed, enable the computer system to perform the features of the embodiments as discussed herein. In particular, the computer programs, when executed, enable the processor multi-core processor to perform the features of the computer system. Accordingly, such computer programs represent controllers of the computer system.

Generally, the term "computer-readable medium" as used herein refers to any medium that participated in providing instructions to the processor 804 for execution. Such a medium may take many forms, including but not limited to, non-volatile media, volatile media, and transmission media. Non-volatile media includes, for example, optical or magnetic disks, such as the storage device 810. Volatile media includes dynamic memory, such as the main memory 806.

Transmission media includes coaxial cables, copper wire and fiber optics, including the wires that comprise the bus 802. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to the processor 804 for execution. For example, the instructions may initially be carried on a magnetic disk of a remote computer. The remote computer can load the instructions into its dynamic memory and send the instructions over a telephone line using a modem. A modem local to the server 830 can receive the data on the telephone line and use an infrared transmitter to convert the data to an infrared signal. An infrared detector coupled to the bus 802 can receive the data carried in the infrared signal and place the data on the bus 802. The bus 802 carries the data to the main memory 806, from which the processor 804 retrieves and executes the instructions. The instructions received from the main memory 806 may optionally be stored on the storage device 810 either before or after execution by the processor 804.

The server 830 also includes a communication interface 818 coupled to the bus 802. The communication interface 818 provides a two-way data communication coupling to a network link 820 that is connected to the world wide packet data communication network now commonly referred to as the Internet 828. The Internet 828 uses electrical, electromagnetic, or optical signals that carry digital data streams. The signals through the various networks and the signals on the network link 820 and through the communication interface 818, which carry the digital data to and from the server 830, are exemplary forms or carrier waves transporting the information.

In another embodiment of the server 830, the communication interface 818 is connected to a local network 822 via a network link 820. For example, the communication interface 818 may be an integrated services digital network (ISDN) card or a modem to provide a data communication connection to a corresponding type of telephone line, which can comprise part of the network link 820. As another example, the communication interface 818 may be a local area network (LAN) card to provide a data communication connection to a compatible LAN. Wireless links may also be implemented. In any such implementation, the communication interface 818 sends and receives electrical, electromagnetic, or optical signals that carry digital data streams representing various types of information.

The network link 820 typically provides data communication through one or more networks to other data devices. For example, the network link 820 may provide a connection through the local network 822 to a host computer 824 or to data equipment operated by an Internet Service Provider (ISP). The ISP in turn provides data communication services through the Internet 828. The local network 822 and the Internet 828 both use electrical, electromagnetic or optical signals that carry digital data streams. The signals through the various networks and the signals on the network link 820 and through the communication interface 818, which carry the digital data to and from the server 830, are exemplary forms or carrier waves transporting the information.

The server 830 can send/receive messages and data, including e-mail, program code, through the network, the network link 820 and the communication interface 818. Further, the communication interface 818 can comprise a USB/Tuner and the network link 820 may be an antenna or cable for connecting the server 830 to a cable provider, satellite provider or other terrestrial transmission system for receiving messages, data and program code from another source.

The example versions of the embodiments described herein may be implemented as logical operations in a distributed processing system such as the system 800 including the servers 830. The logical operations of the embodiments may be implemented as a sequence of steps executing in the server 830, and as interconnected machine modules within the system 800. The implementation is a matter of choice and can depend on performance of the system 800 implementing the embodiments. As such, the logical operations constituting said example versions of the embodiments are referred to for example, as operations, steps or modules.

Similar to a server 830 described above, a client device 801 can include a processor, memory, storage device, display, input device and communication interface (e.g., e-mail interface) for connecting the client device to the Internet 828, the ISP, or local network 822, for communication with the servers 830. The system 800 can further include computers (e.g., personal computers, computing nodes) 805 operating in the same manner as client devices 801, where a user can utilize one or more computers 805 to manage data in the server 830.

Figure 9:
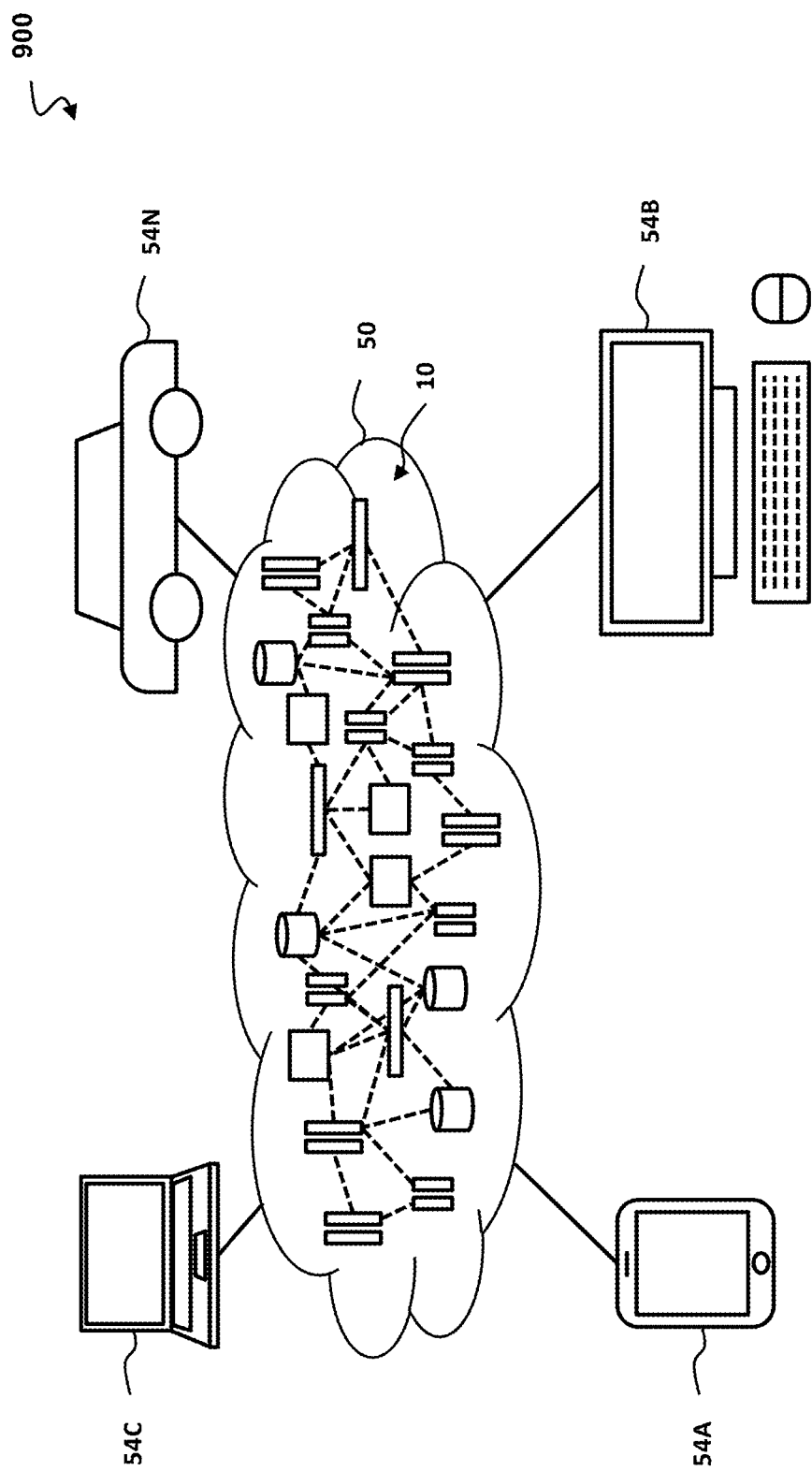
FIG. 9 depicts an illustrative cloud computing environment, according to one embodiment.

Referring now to FIG. 9, network 900 depicts several local computing devices coupled to illustrative cloud computing environment 50. As shown, cloud computing environment 50 comprises one or more cloud computing nodes 10 with which local computing devices used by cloud consumers, such as, for example, personal digital assistant (PDA), smartphone, smart watch, set-top box, video game system, tablet, mobile computing device, or cellular telephone 54A, desktop computer 54B, laptop computer 54C, and/or automobile computer system 54N may communicate. The nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that the computing nodes 10 and the cloud computing environment 50 can communicate with any type of computerized device over any type of network and/or network addressable connection (e.g., using a web browser).

Figure 10:
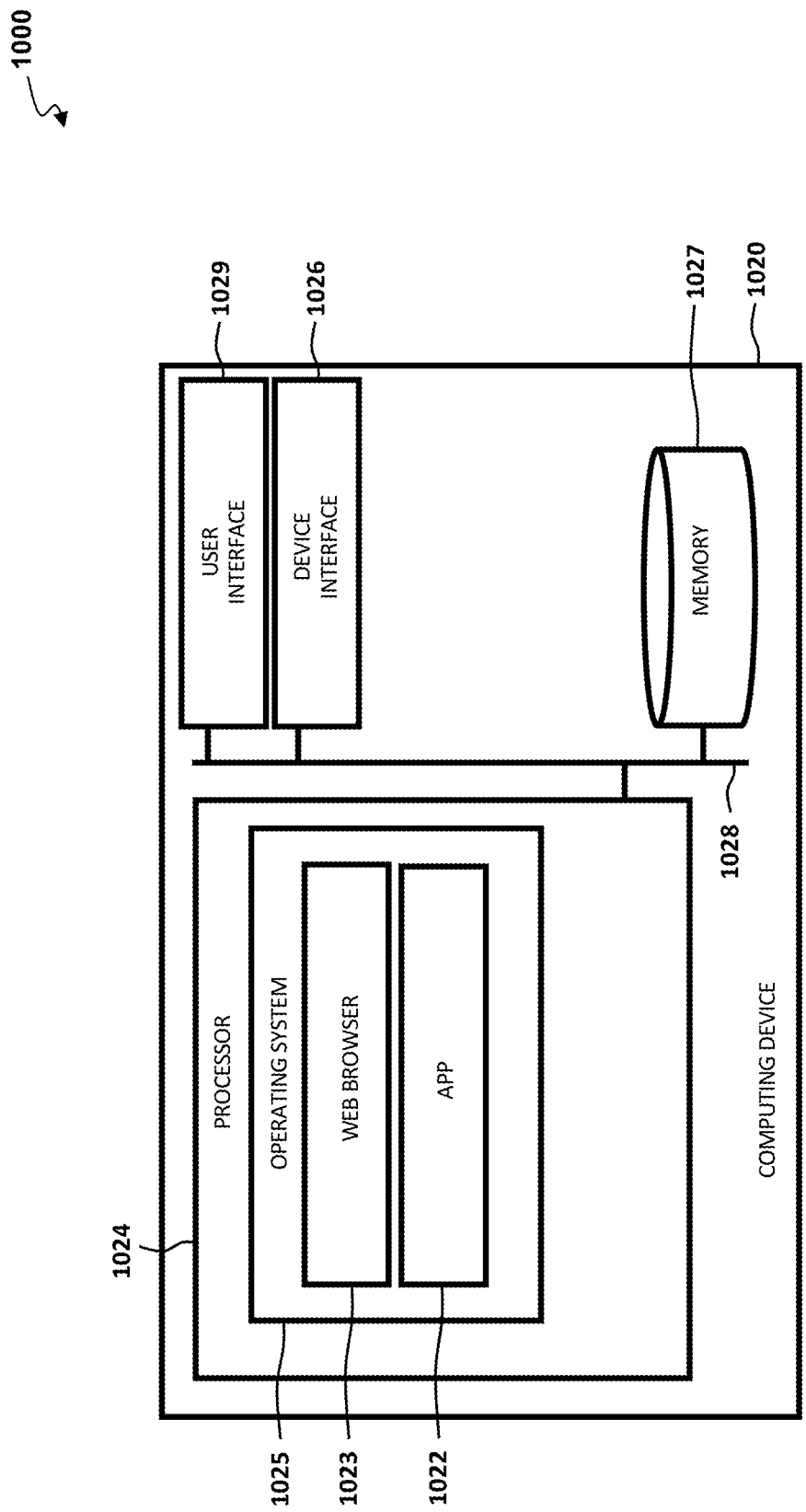
FIG. 10 illustrates an example of a top-level functional block diagram of a computing device embodiment.

FIG. 10 illustrates an example of a top-level functional block diagram of a computing device embodiment 1000. The example operating environment is shown as a computing device 1020 comprising a processor 1024, such as a central processing unit (CPU), addressable memory 1027, an external device interface 1026, e.g., an optional universal serial bus port and related processing, and/or an Ethernet port and related processing, and an optional user interface 1029, e.g., an array of status lights and one or more toggle switches, and/or a display, and/or a keyboard and/or a pointer-mouse system and/or a touch screen. Optionally, the addressable memory may include any type of computer-readable media that can store data accessible by the computing device 1020, such as magnetic, hard, and floppy disk drives, optical disk drives, magnetic cassettes, tape drives, flash memory cards, digital video disks (DVDs), Bernoulli cartridges, RAMs, ROMs, smart cards, etc. Indeed, any medium for storing or transmitting computer-readable instructions and data may be employed, including a connection port to or node on a network, such as a LAN, WAN, or the Internet. These elements may be in communication with one another via a data bus 1028. In some embodiments, via an operating system 1025 such as one supporting a web browser 1023 and applications 1022, the processor 1024 may be configured to execute steps of a process establishing a communication channel and processing according to the embodiments described above.

It is contemplated that various combinations and/or sub-combinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further, it is intended that the scope of the present invention is herein disclosed by way of examples and should not be limited by the particular disclosed embodiments described above.

What is claimed is:

1. A method of monitoring power consumption of a known electronic device, the method comprising:
    monitoring, by a monitoring device, a received input electrical power from the known electronic device;
    determining, by a microprocessor of the monitoring device, a maximum measured power value of the monitored input electrical power, wherein the maximum measured power value is determined based on scanning an Analog to Digital Converter (ADC) input pin;
    converting, by the microprocessor, the determined maximum power value to a current value;
    determining, by the microprocessor, whether the converted current value is greater than zero;
    connecting, by the microprocessor, to a remote computing device and obtaining access to communicate with the remote computing device via an authentication process;
    transmitting, by the microprocessor, data to the connected remote computing device based on whether the determined converted current value is greater than zero; and
    determining, by the remote computing device, a utilization rate of the known electronic device based on comparing the received transmitted data from the monitoring device against an associated standby current usage of a set of similar known electronic devices.

2. The method of claim 1 wherein the input electrical power is an ADC input pin.

3. The method of claim 1 wherein monitoring a received input electrical power comprises taking a multitude of power measurements at the determined utilization rate.

4. The method of claim 3 wherein the determined utilization rate is based on measurements at predetermined intervals.

5. The method of claim 1 wherein the authentication process is performed wirelessly.

6. The method of claim 1 wherein the authentication process comprises an OAUTH2 authentication process performed by the remote computing device authenticating the monitoring device.

7. The method of claim 1 wherein the transmitted data comprises:
    the determined converted current value; and
    a set of unique device data associated with the monitored known electronic device.

8. The method of claim 1 further comprising:
    receiving data associated with the known electronic device from the remote computing device and use the received data to associate the received monitored device with a set of previously stored data by the remote computing device.

9. The method of claim 8 further comprising:
    recording the received monitored data if information in the received monitored data is greater than information in set of previously stored data.

10. The method of claim 9 wherein the previously stored data comprises a list of electronic devices with corresponding mac addresses and maximum standby power values.

11. The method of claim 1 wherein the determined maximum power value is converted, by the microprocessor, to a Root Mean Square (RMS) current value.

12. The method of claim 1 wherein the monitoring device comprises a Hall effect current sensor, a microprocessor, and a power supply and conditioner, and wherein the power supply and conditioner is used to power the microprocessor and the Hall effect current sensor.

13. The power line utilization monitoring system of claim 12 wherein the power supply and conditioner is used to power the microprocessor and the Hall effect current sensor.

14. The power line utilization monitoring system of claim 12 wherein the Hall effect current sensor is configured to monitor a monitored mains power line and transmits the monitored voltage value to the microprocessor via an ADC pin.

15. A power line utilization monitoring system comprising:
    a test equipment;
    a monitoring device comprising a Hall effect current sensor, a microprocessor, and a power supply and conditioner, wherein the microprocessor is configured to receive a voltage value transmitted by the Hall effect current sensor and to convert the received voltage value to a current value, and to determine a maximum measured power value of the monitored input electrical power; and
    a remote computing device, wherein the remote computing device comprises an authentication server, a web service, and a database service;
    wherein the microprocessor of the monitoring device is configured to determine a change in the test equipment status based on comparing the converted current value with a threshold current value;
    wherein the microprocessor of the monitoring device is further configured to communicate with the remote computing device based on a determined change in the test equipment status; and
    wherein the remote computing device is configured to determine a utilization rate of the test equipment based on a set of data received from the microprocessor.

* * * * *